United States Patent
Zhang et al.

(10) Patent No.: US 10,995,511 B2
(45) Date of Patent: May 4, 2021

(54) SELF-RECOVERING ENERGY DISSIPATION STEEL SUPPORT WITH SHAPE MEMORY ALLOY DAMPER

(71) Applicant: Chunwei Zhang, Shandong (CN)

(72) Inventors: Chunwei Zhang, Shandong (CN); Yue Wang, Shandong (CN); Li Sun, Shandong (CN); Limeng Zhu, Shandong (CN); Dianwei Gao, Shandong (CN)

(73) Assignee: Chunwei Zhang, Qiangdao (CN)

( * ) Notice: Subject to any disclaimer, the term of this patent is extended or adjusted under 35 U.S.C. 154(b) by 0 days.

(21) Appl. No.: 16/992,582

(22) Filed: Aug. 13, 2020

(65) Prior Publication Data

US 2020/0370324 A1 Nov. 26, 2020

Related U.S. Application Data

(63) Continuation of application No. PCT/CN2019/094236, filed on Jul. 1, 2019.

(30) Foreign Application Priority Data

Nov. 29, 2018 (CN) .......................... 201811438433.X

(51) Int. Cl.
*E04H 9/02* (2006.01)
*E04B 1/98* (2006.01)
(Continued)

(52) U.S. Cl.
CPC ............ *E04H 9/0237* (2020.05); *E04B 1/98* (2013.01); *F16F 13/00* (2013.01); *F16F 15/02* (2013.01);
(Continued)

(58) Field of Classification Search
CPC ... E04H 9/0237; F16F 2224/0258; E04B 1/98
See application file for complete search history.

(56) References Cited

U.S. PATENT DOCUMENTS 5,842,312 A * 12/1998 Krumme ............... B63B 21/502
52/167.1
6,286,895 B1 * 9/2001 Urushiyama ........... B60R 19/00
188/371

(Continued)

FOREIGN PATENT DOCUMENTS

CN 204626690 U 9/2015
CN 108060725 A 5/2018
(Continued)

OTHER PUBLICATIONS

Anh J H; KR-1724535-B1; Apr. 2017. (Year: 2017).*
Hu J W; KR-2016086664-A; Jul. 2016. (Year: 2016).*

*Primary Examiner* — Thomas J Williams

(57) ABSTRACT

The present invention relates to the technical field of energy dissipation and shock absorption buildings, and particularly relates to a self-recovering energy dissipation support with a shape memory alloy damper. The self-recovering energy dissipation support includes a core shape memory alloy damper and cross-shaped steel columns, wherein the shape memory alloy damper includes two sets of inner and outer sleeves. A sliding groove is arranged between the inner sleeve and the outer sleeve, so that the inner sleeve and the outer sleeve can slide relative to each other along a track. The two sets of inner sleeves are connected through pre-stretched shape memory alloy ribs I. The inner sleeves and the outer sleeves are connected through pre-stretched shape memory alloy ribs II. An outer end plate of the shape memory alloy damper is connected with the cross-shaped steel columns.

6 Claims, 3 Drawing Sheets

(51) Int. Cl.
*F16F 15/02* (2006.01)
*F16F 13/00* (2006.01)

(52) U.S. Cl.
CPC .............. *F16F 2224/0208* (2013.01); *F16F 2224/0258* (2013.01)

(56) References Cited

U.S. PATENT DOCUMENTS

| | | | | |
|---|---|---|---|---|
| 8,250,818 | B2 * | 8/2012 | Tremblay | E04H 9/02 52/167.3 |
| 2011/0148015 | A1 * | 6/2011 | Hodgson | F16F 1/04 267/136 |
| 2016/0326742 | A1 * | 11/2016 | Haque | E04B 1/98 |

FOREIGN PATENT DOCUMENTS

| | | | | |
|---|---|---|---|---|
| CN | 208024043 U | 10/2018 | | |
| CN | 109505364 A | 3/2019 | | |
| EP | 1016765 A2 * | 7/2000 | ............. | E04H 9/02 |
| EP | 2504604 B1 * | 9/2017 | ............... | F16F 7/14 |
| KR | 101368653 B1 * | 3/2014 | ............... | E04B 1/98 |
| KR | 101457059 B1 | 11/2014 | | |
| WO | WO-2019031669 A1 * | 2/2019 | ............... | E04B 1/98 |

\* cited by examiner

SELF-RECOVERING ENERGY DISSIPATION STEEL SUPPORT WITH SHAPE MEMORY ALLOY DAMPER

CROSS-REFERENCE TO RELATED APPLICATIONS

This application is a continuation of International Application No. PCT/CN2019/094236, filed on Jul. 1, 2019, which claims the benefit of priority from Chinese Patent Application No. 201811438433.X filed on Nov. 29, 2018. The content of the aforementioned applications, including any intervening amendments thereto, is incorporated herein by reference.

TECHNICAL FIELD

The present invention relates to the technical field of energy dissipation and shock absorption buildings, and particularly relates to a self-recovering energy dissipation support with a shape memory alloy damper.

BACKGROUND OF THE PRESENT INVENTION

Earthquakes have the characteristics of randomness, suddenness and uncertainty and are a kind of extremely-destructive natural disasters. How to effectively reduce the response of engineering structures to the action of earthquakes and other dynamic loads and to control the residual deformation of the structures so as to improve the capacity of the structures to resist natural disasters has been a research hotspot in the field of civil engineering.

Energy dissipation supports can improve lateral rigidity and strength of a frame structure, can effectively dissipate the earthquake energy when the earthquake occurs and are an effective and economical structural form proved in the actual engineering. However, the traditional support is prone to buckling under pressure and may withdraw from work earlier, resulting in insufficient energy dissipation capacity. Although the novel energy dissipation supports such as buckling constraint supports, frictional energy dissipation supports and the like can prevent support members from withdrawing from the work early so as to achieve good energy dissipation capacity, the permanent deformation after the strong earthquake is difficult to recover, and generally the whole support needs to be replaced, resulting in waste.

Shape memory alloy has the characteristics of shape memory effect, superelasticity effect, high damping property and the like. The superelasticity effect is a special hysteretic energy dissipation property and has the advantages of allowing large deformation and capability of restoring the deformation. When the material is combined with the existing energy dissipation and shock absorption device, the disadvantages of the performance of some traditional devices can be overcome. However, the asymmetry of the tensile and compressive properties of the shape memory alloy material also brings challenges to its reasonable application.

SUMMARY OF THE PRESENT INVENTION

The purpose of the present invention is to provide a self-recovering energy dissipation steel support with a shape memory alloy damper, which solves the technical problems of a steel frame support in the prior art that the energy dissipation and shock absorption effect is poor and the residual deformation is unrecoverable.

The purpose of the present invention is realized through the following technical solution: the self-recovering energy dissipation support with the shape memory alloy damper includes a shape memory alloy damper and cross-shaped steel columns. The shape memory alloy damper includes two sets of rectangular square-steel-tube inner sleeves, two sets of outer sleeves, shape memory alloy ribs I and shape memory alloy ribs II. An end plate at one side of each cross-shaped steel column is connected with the outer sleeve of the shape memory alloy damper, and the other side is connected with a building structure through a semicircular connecting plate with a bolt hole.

Further, the outer wall of the inner sleeve is provided with a grooved track symmetric about a symmetric axis of a section. The grooved track is grooved close to a first end surface of the inner sleeve, and is rectangular close to a second end surface of the inner sleeve. The inner wall of the outer sleeve is provided with a convex track corresponding to the grooved track. The convex track is convex close to a first end surface of the outer sleeve and is rectangular close to a second end surface of the outer sleeve. The inner sleeves and the outer sleeves can be connected slidably through the cooperation of the grooved track and the convex track.

The second end surface of the inner sleeve is symmetrically provided with inner sleeve connecting plates with holes, and both ends of the inner sleeve are provided with a damper inner end plate with holes on four corners. The first end surface of the outer sleeve is symmetrically provided with outer sleeve connecting plates with holes. The two sets of inner sleeves are connected by inserting the shape memory alloy ribs I into the damper inner end plates with holes in a stretching and anchoring manner. The two sets of inner sleeves and outer sleeves are respectively connected by inserting the shape memory alloy ribs II into the inner sleeve connecting plates with the holes and the outer sleeve connecting plates with the holes in a stretching and anchoring manner.

When the self-recovering energy dissipation steel support with the shape memory alloy damper is not stressed, a pre-applied tensile force on the shape memory alloy ribs I enables the two sets of inner sleeves in the shape memory alloy damper to be connected tightly without relative movement. The pre-applied tensile force on the shape memory alloy ribs II enables the inner sleeves and the outer sleeves in the shape memory alloy damper to be connected tightly without relative movement. When the self-recovering energy dissipation support with the shape memory alloy damper is tensioned, the two cross-shaped steel columns drive the two sets of outer sleeves to move in opposite directions to make the two sets of outer sleeves drive the two sets of inner sleeves to move in opposite directions; at this time, the shape memory alloy ribs I connecting the two sets of inner sleeves are tensioned, and the inner sleeves and the outer sleeves do not have relative movement; therefore, the shape memory alloy ribs II connecting the inner sleeves and the outer sleeves are not stressed. When the self-recovering energy dissipation support with the shape memory alloy damper is stressed, the two sets of inner sleeves are connected tightly with no seam, the shape memory alloy ribs I therein are not stressed, and the cross-shaped steel columns move along with the lengthwise relative movement of the two sets of outer sleeves and two sets of inner sleeves. The relative movement between the inner sleeves and the outer sleeves makes the shape memory alloy ribs II connecting the inner sleeves and the outer sleeves tensioned.

Compared with the prior art, the present invention has the following beneficial effects:

(1) The steel support formed by combining the cross-shaped steel columns and the shape memory alloy damper has an effect of integrating the energy dissipation and self-recovering function, can achieve good hysteretic performance in earthquake, has no residual deformation after the earthquake, and can greatly reduce the post-earthquake repair work and cost.

(2) In the core shape memory alloy damper, the inner sleeve and the inner sleeve are connected through the shape memory alloy ribs I, the inner sleeves and the outer sleeves are connected through the shape memory alloy ribs II, and through the relative movement between the inner sleeves and the outer sleeves, the shape memory material can be kept at a tensioned state when the support is tensioned or stressed, thereby ensuring that the support has stable and good self-recovering and energy dissipation capacity, and effectively improving the anti-earthquake performance of the building.

(3) In the present invention, the shape memory alloy is anchored on the inner end plate through pre-stretching, the diameter thereof can be freely selected according to stress conditions of the actual engineering and is not limited, and the connection is simple.

1, shape memory alloy damper; 2, cross-shaped steel column; 3, rectangular square-steel-tube inner sleeve; 4, rectangular square-steel-tube outer sleeve; 5, grooved track; 6, inner sleeve connecting plate with holes; 7, damper inner end plate; 8, convex track; 9, outer sleeve connecting plate with holes; 10, shape memory alloy rib I; 11, shape memory alloy rib II; 12, cross-shaped steel column end plate; 13, semicircular connecting plate with a bolt hole; 14, hole on the damper inner end plate; 15, hole on the inner sleeve connecting plate; 16, hole on the outer sleeve connecting plate; 17, bolt hole on the semicircular connecting plate; 18, first end surface of the inner sleeve; 19, second end surface of the inner sleeve; 20, first end surface of the outer sleeve; 21, second end surface of the outer sleeve.

DETAILED DESCRIPTION OF THE PRESENT INVENTION

Specific embodiments of the present invention are further described below in combination with the accompanying drawings and technical solution.

Figure 1:
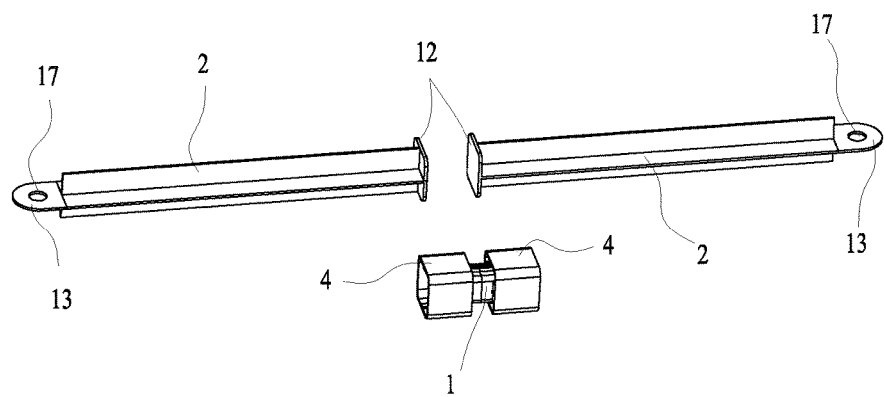
FIG. 1 is a structural schematic diagram of a self-recovering energy dissipation support with a shape memory alloy damper of the present invention.
Figure 2:
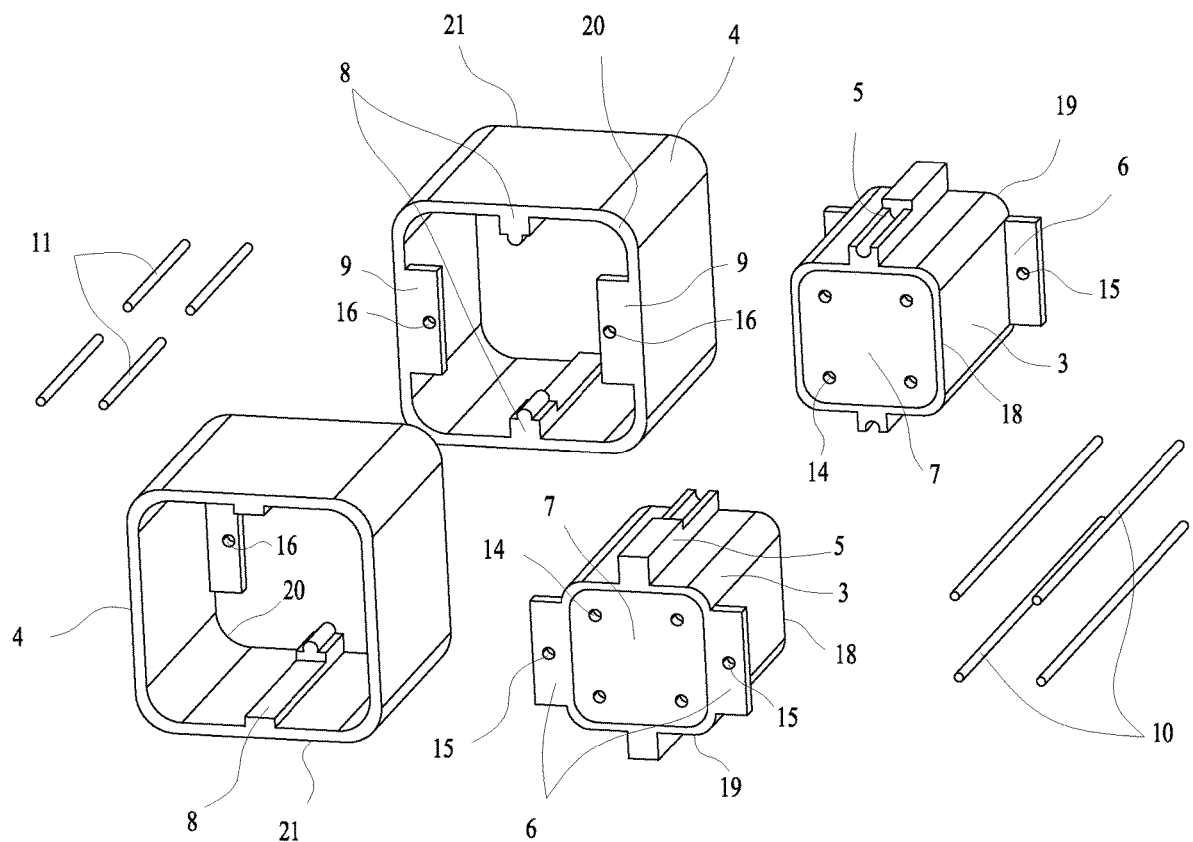
FIG. 2 is a stereoscopic schematic diagram of assembling of a shape memory alloy damper of the present invention.

As shown in FIGS. 1-2, a self-recovering energy dissipation support with a shape memory alloy damper in the present invention includes a shape memory alloy damper 1 and cross-shaped steel columns 2. An end plate 12 at one side of each cross-shaped steel column 2 is connected with an outer sleeve 4 of the shape memory alloy damper 1, and a semicircular connecting plate 13 with a bolt hole 17 at the other side is connected with an external building structure.

As shown in FIG. 2, the shape memory alloy damper 1 includes two sets of rectangular square-steel-tube inner sleeves 3 and outer sleeves 4 and shape memory alloy ribs 10 and 11. The outer wall of each inner sleeve 3 is provided with a grooved track 5 symmetric about a symmetric axis of a section. The grooved track 5 is grooved close to a first end surface 18 of the inner sleeve 3 and is rectangular close to a second end surface 19 of the inner sleeve 3. The inner wall of each outer sleeve 4 is provided with a convex track 8 corresponding to the grooved track 5. The convex track 8 is convex close to a first end surface 20 of the outer sleeve 4 and is rectangular close to a second end surface 21 of the outer sleeve 4. The inner sleeves 3 and the outer sleeves 4 are connected slidably through the cooperation of the grooved tracks 5 and the convex tracks 8.

The second end surface 19 of the inner sleeve 3 is symmetrically provided with inner sleeve connecting plates 6 with holes 15, and both ends of each inner sleeve 3 are provided with a damper inner end plate 7 with holes 14 on four corners. The first end surface 20 of the outer sleeve 4 is symmetrically provided with outer sleeve connecting plates 9 with holes. The damper inner end plate 7 with the holes 14 is arranged in the inner sleeve 3. The two sets of inner sleeves 3 are connected by inserting shape memory alloy ribs I 10 into the damper inner end plate 7 with the holes 14 in a stretching and anchoring manner. By inserting shape memory alloy ribs II 11 into the inner sleeve connecting plate 6 with the holes 15 and the outer sleeve connecting plate 9 with holes 16 and stretching and anchoring the shape memory alloy ribs, the two sets of inner sleeves 3 and the two sets of outer sleeves 4 are connected respectively.

Figure 3:
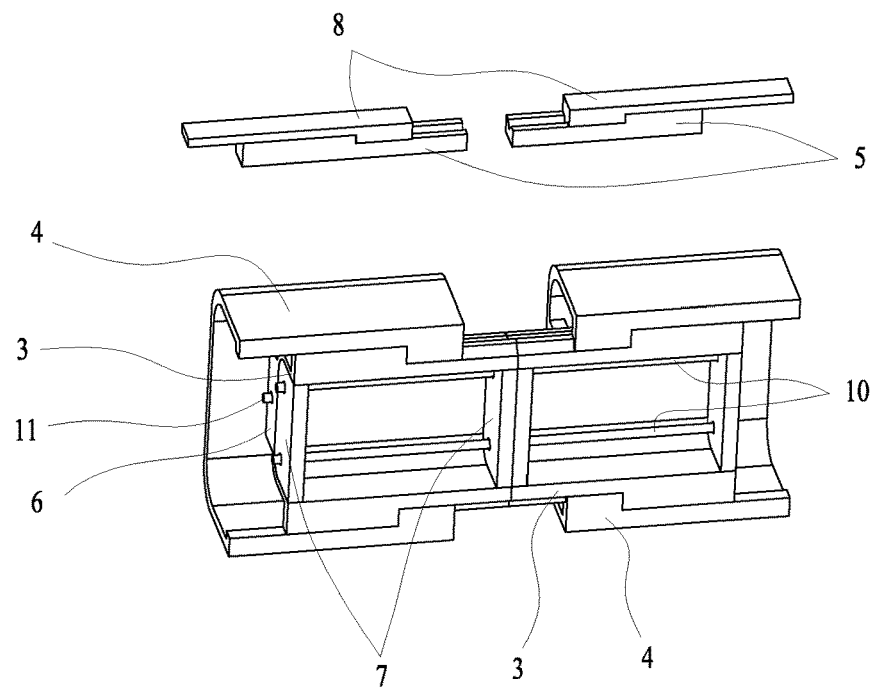
FIG. 3 is a relative location diagram of sectional sliding grooves of a shape memory alloy damper when a support is not stressed.

As shown in FIG. 2 and FIG. 3, when the self-recovering energy dissipation support with the shape memory alloy damper is not stressed, a pre-applied tensile force on the shape memory alloy ribs I 10 enables the two sets of inner sleeves 3 in the shape memory alloy damper 1 to be connected tightly without relative movement. The pre-applied tensile force on the shape memory alloy ribs II 11 enables the inner sleeves 3 and outer sleeves 4 in the shape memory alloy damper 1 to be connected tightly without relative movement.

Figure 4:
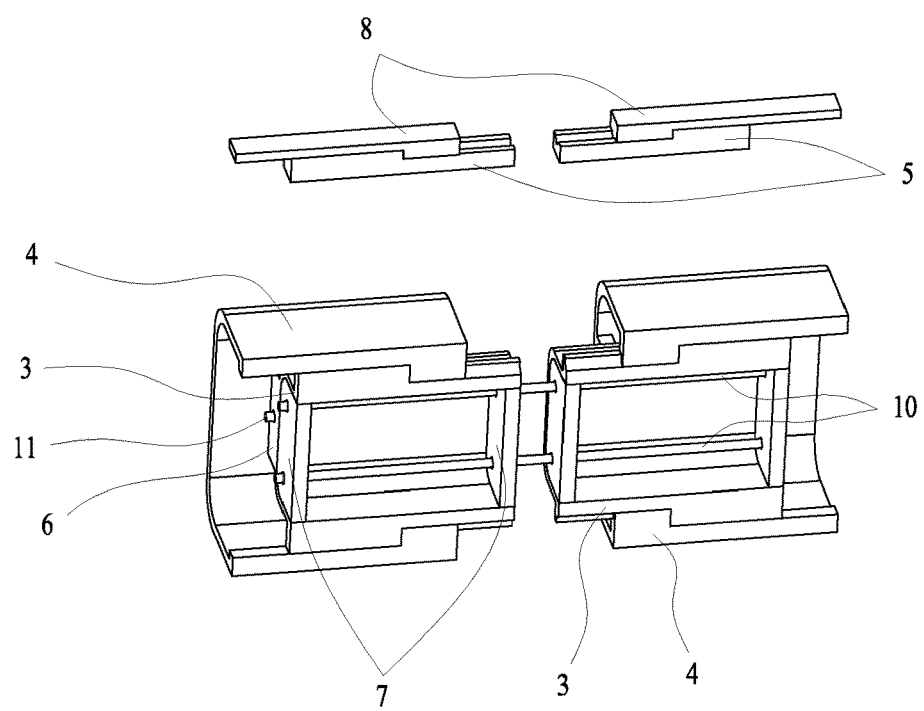
FIG. 4 is a relative location diagram of sectional sliding grooves of a shape memory alloy damper when a support is tensioned.

As shown in FIG. 1 and FIG. 4, when the self-recovering energy dissipation support with the shape memory alloy damper is tensioned, the two cross-shaped steel columns 2 drive the two sets of outer sleeves 4 to move in opposite directions so as to make the two sets of outer sleeves (4) drive the two sets of inner sleeves 3 to move in opposite directions, and at this time, the shape memory alloy ribs I 10 connecting the two sets of inner sleeves 3 are tensioned, while the inner sleeves 3 and the outer sleeves 4 have no relative movement. Therefore, the shape memory alloy ribs II 11 connecting the inner sleeves 3 and the outer sleeves 4 are not stressed.

Figure 5:
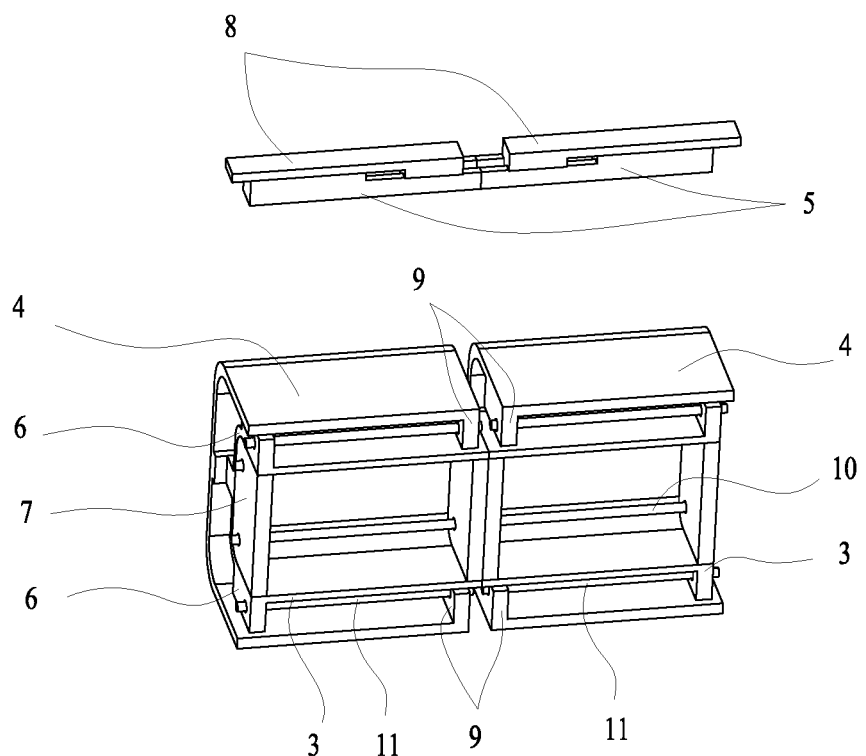
FIG. 5 is a relative location diagram of sectional sliding grooves of a shape memory alloy damper when a support is stressed.

As shown in FIG. 1 and FIG. 5, when the self-recovering energy dissipation support with the shape memory alloy damper is stressed, the two sets of inner sleeves 3 are connected tightly with no seam, and the shape memory alloy ribs I 10 therein are not stressed, while the two cross-shaped steel columns 2 move along with the relative movement between the two sets of outer sleeves 4 and the two sets of inner sleeves 3. The relative movement between the inner sleeves 3 and the outer sleeves 4 make the shape memory alloy ribs II 11 connecting the inner sleeves 3 and the outer sleeves 4 tensioned.

The above only describes preferred embodiments of the present invention and shall not be considered as limiting the scope of embodiments of the present invention. For those skilled in the art, various changes and variations of the present invention can be made. Any modifications, equivalent substitution and improvements made within the substantial scope of the present invention shall be included within the protection scope of the present invention.

The invention claimed is:

1. A self-recovering energy dissipation support with a shape memory alloy damper, comprising the shape memory alloy damper (1) and cross-shaped steel columns (2), wherein the shape memory alloy damper (1) comprises two sets of rectangular steel-tube inner sleeves (3) and two sets of outer sleeves (4); a damper inner end plate (7) with holes (14) is arranged in each inner sleeve (3); the two sets of inner sleeves (3) are connected by inserting shape memory alloy ribs I(10) into the damper inner end plates (7) with holes in a stretching and anchoring manner; the two sets of inner sleeves (3) and outer sleeves (4) are respectively connected by inserting shape memory alloy ribs II(11) into inner sleeve connecting plates (6) with holes (15) and outer sleeve connecting plates (9) with holes (16) in a stretching and anchoring manner; the outer sleeves (4) of the shape memory alloy damper are connected with cross-shaped steel column end plates (12); and the cross-shaped steel columns (2) are connected with an external building structure through a semicircular connecting plate (13) with a bolt hole (17) at an end.

2. The self-recovering energy dissipation support with the shape memory alloy damper according to claim 1, wherein the outer wall of each inner sleeve (3) is provided with a grooved track (5) symmetric about a symmetric axis of a section; the grooved track (5) is grooved close to a first end surface (18) of the inner sleeve (3), and is rectangular close to a second end surface (19) of the inner sleeve (3); the second end surface (19) of the inner sleeve (3) is symmetrically provided with inner sleeve connecting plates (6) with holes (15), and both ends of the inner sleeve (3) are provided with the damper inner end plate (7) with holes (14) on four corners.

3. The self-recovering energy dissipation support with the shape memory alloy damper according to claim 2, wherein the inner wall of the outer sleeve (4) is provided with a convex track (8) corresponding to the grooved track (5); the convex track (8) is convex close to a first end surface (20) of the outer sleeve (4) and is rectangular close to a second end surface (21) of the outer sleeve (4); and the first end surface (20) of the outer sleeve (4) is symmetrically provided with the outer sleeve connecting plates (9) with the holes (16).

4. The self-recovering energy dissipation support with the shape memory alloy damper according to claim 3, wherein the inner sleeves (3) and the outer sleeves (4) are connected slidably through the cooperation of the grooved track (5) and the convex track (8).

5. The self-recovering energy dissipation support with the shape memory alloy damper according to claim 1, wherein a cross-shaped steel column end plate (12) is arranged at one side of each cross-shaped steel column (2) connected with the shape memory alloy damper (1), and the other side is provided with the semicircular connecting plate (13) with the bolt hole (17).

6. The self-recovering energy dissipation support with the shape memory alloy damper according to claim 1, wherein when the self-recovering energy dissipation steel support with the shape memory alloy damper is not stressed, a pre-applied tensile force on the shape memory alloy ribs I(10) enables the two sets of inner sleeves (3) in the shape memory alloy damper (1) to be connected tightly without relative movement; the pre-applied tensile force on the shape memory alloy ribs II(11) enables the inner sleeves (3) and the outer sleeves (4) in the shape memory alloy damper (1) to be connected tightly without relative movement; when the self-recovering energy dissipation support with the shape memory alloy damper is tensioned, the two cross-shaped steel columns (2) drive the two sets of outer sleeves (4) to move in opposite directions to make the two sets of outer sleeves (4) drive the two sets of inner sleeves (3) to move in opposite directions; at this time, the shape memory alloy ribs I(10) connecting the two sets of inner sleeves (3) are tensioned, and the inner sleeves (3) and the outer sleeves (4) do not have relative movement; therefore, the shape memory alloy ribs II(11) connecting the inner sleeves (3) and the outer sleeves (4) are not stressed; when the self-recovering energy dissipation support with the shape memory alloy damper is stressed, the two sets of inner sleeves (3) are connected tightly with no seam, the shape memory alloy ribs I(10) therein are not stressed, and the cross-shaped steel columns (2) move along with the lengthwise relative movement of the two sets of outer sleeves (4) and two sets of inner sleeves (3); and the relative movement between the inner sleeves (3) and the outer sleeves (4) makes the shape memory alloy ribs II(11) connecting the inner sleeves (3) and the outer sleeves (4) tensioned.

\* \* \* \* \*